United States Patent
Zanger et al.

(10) Patent No.: US 6,424,453 B1
(45) Date of Patent: Jul. 23, 2002

(54) METHOD FOR THE PRODUCTION OF GAUSSIAN INTENSITY DISTRIBUTIONS IN THE BEAM PROFILE OF RADIATION GENERATED BY NON-LINEAR OPTICAL PROCESSES

(75) Inventors: Eckhard Zanger, Seddin; Ralf Müller; Wolfgang Gries, both of Berlin, all of (DE)

(73) Assignee: LAS Laser Analytical Systems, GmbH (DE)

( * ) Notice: Subject to any disclaimer, the term of this patent is extended or adjusted under 35 U.S.C. 154(b) by 0 days.

(21) Appl. No.: 09/352,530

(22) Filed: Jul. 13, 1999

(30) Foreign Application Priority Data

Jul. 13, 1998 (DE) ......................................... 198 32 647

(51) Int. Cl.[7] ................................................ G02F 1/35
(52) U.S. Cl. ....................................... 359/326; 359/328
(58) Field of Search ................................ 359/326–332, 359/342–344, 346; 385/31, 33–35, 38, 122

(56) References Cited

U.S. PATENT DOCUMENTS

| 5,111,468 A | * | 5/1992 | Kozlovsky et al. ..... 359/328 X |
| 5,353,292 A | * | 10/1994 | Motegi .................... 359/326 X |
| 5,793,521 A | * | 8/1998 | O'Brien et al. ............. 359/344 |
| 5,835,643 A | * | 11/1998 | Fukumoto et al. ........ 385/31 X |
| 5,936,991 A | * | 8/1999 | Lang et al. ............. 359/344 X |

FOREIGN PATENT DOCUMENTS

| DE | 3903943 | 8/1990 |
| DE | 19536880 | 3/1997 |

OTHER PUBLICATIONS

J. Fève, et al.; Determination of the Longitudinal Profile of a Focused Nd:YAG Gaussian Bean from Second–Harmonic Generation in a Thin KTP Crystal; Applied Optics, vol. 33, No. 15, May 20, 1994; pp. 3169–3174.

K. Shinozaki, et al.; A Comparison of Optical Second–Harmonic Generation Efficiency Using Bessel and Gaussian Beams in Bulk Crystals; Elsevier Science B.V.; 030–4018, Jan. 1, 1997; pp. 300–304, Optics Communications, vol. 133.

A. Siegman; Lasers—Chapter 17 Physical Properties of Gaussian Beams; University Science Books, 1986, pp. 663–670.

J.Zondy; Comparative Theory of Walkoff–Limited Type–II Versus Type–I Second Harmonic Generation with Gaussian Beams; Elsevier Science Publishers B.V., 0030–4018/91; vol. 81, No. 6; Mar. 15, 1991; pp. 427–440, Optics Communications.

* cited by examiner

Primary Examiner—John D. Lee
(74) Attorney, Agent, or Firm—Norris, McLaughlin & Marcus P.A.

(57) ABSTRACT

A method for the production of Gaussian intensity distribution in the beam profile of secondary radiation generated by non-linear optical processes, particularly frequency conversion and more particularly frequency doubling of a primary radiation beam. The non-linearly generated, secondary radiation beam is non-Gaussian in profile due to the walk-off effect and has a near field path near the non-linear optical material and a transition field path interconnecting the near field path with a remote, or far, field path. A Gaussian secondary beam profile of substantially circular cross-section is produced at a finite distance from the optical material by providing an optical system in the transition path which, taken as a whole, has no divergence altering or imaging effect on the secondary radiation beam.

11 Claims, 3 Drawing Sheets

Figure 3:
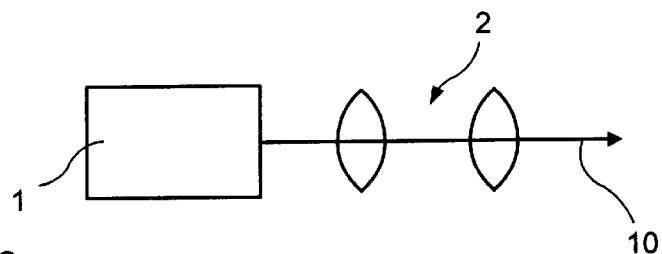

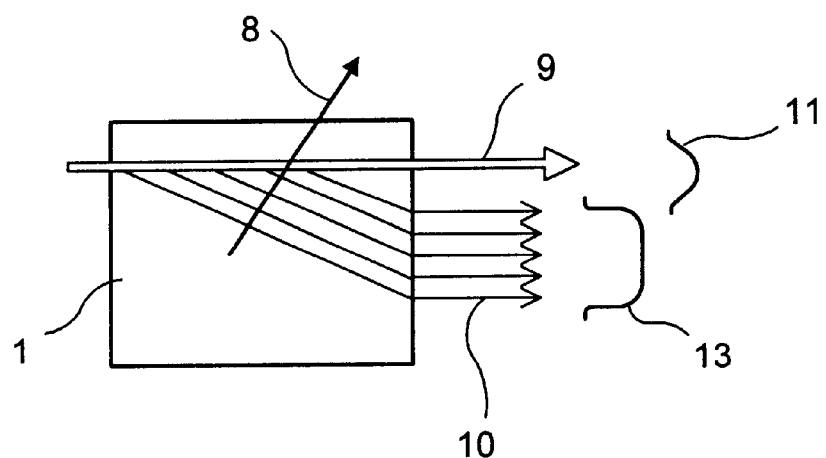
F I G. 1
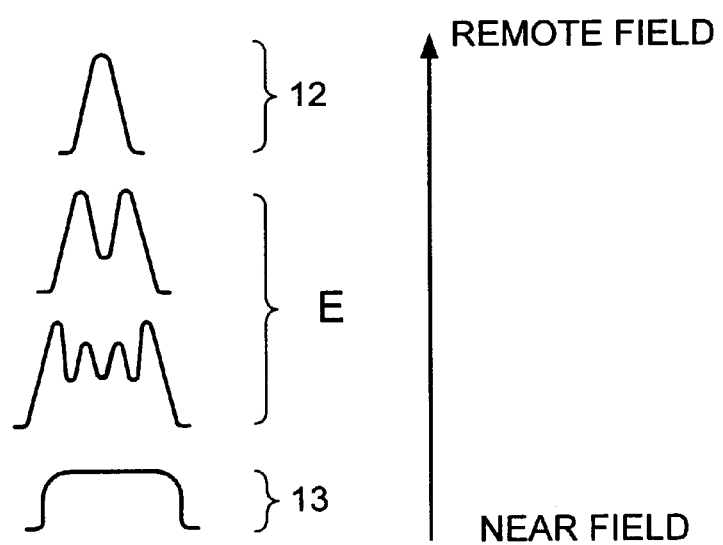
F I G. 2

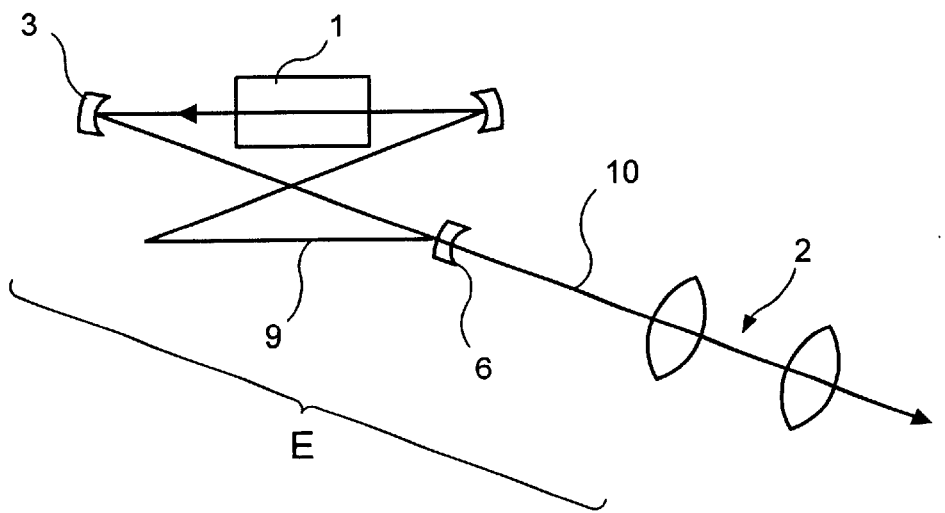
F I G. 7
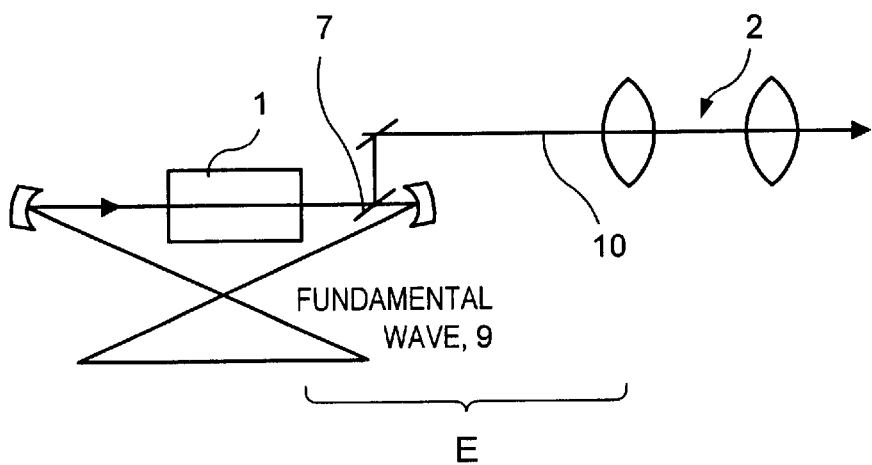
F I G. 8

METHOD FOR THE PRODUCTION OF GAUSSIAN INTENSITY DISTRIBUTIONS IN THE BEAM PROFILE OF RADIATION GENERATED BY NON-LINEAR OPTICAL PROCESSES

The invention relates to a method for the production of Gaussian intensity distributions in the beam profile of radiation generated by nonlinear optical processes in terms of the classifying clause of claim 1.

A fundamental requirement of laser applications consists of beam profiles exhibiting a defined radial intensity distribution. The intensity distribution of the radiation in a transverse section is designated as the beam profile thereof. The commonest form of the required radial distribution is that of a rotationally symmetrical Gaussian function according to the formula $$E_{(r)} = E_0 e^{(-r^2/w^2)}$$

It is of significance that Gaussian intensity distribution reoccurs in the laser beam generated in the course of frequency conversion by non-linear optical processes.

The most important non-linear optical materials for non-linear optical processes are crystals, with the result that outstanding significance is attributed to these materials.

The intensity distribution or the beam profile of a laser beam generated in a non-linear optical process is dependent on the beam profile of the impinging radiation, the wavelengths of the light participating as well as the crystal properties, such as refractive index, birefringence angle and interaction length. Since the impinging and generated laser beams do not usually have the same wavelength, the dispersive properties of the crystal have an effect. This generally induces spatial separation of the generated and impinging waves in the direction of the optical axis of the crystal. This effect, commonly designated as the walk-off effect, is generally known as an effect limiting the efficiency of non-linear optical processes (A. Ashkin, G. D. Boyd, J. M. Dzieduc in: IEEE Journ. Quantum Electronics, QE-2, No. 6 (1966); S. Bouroix, M. D. Plimmer, F. Nez, L. Julien, F. Biraben in: Opt. Comm., Vol. 99 (1993)).

In addition to the above, the walk-off effect has influence on the beam profile of the wave generated. As shown in FIG. 1, the progressive divergence of the beam generated from the impinging beam along the path of the beams within the crystal leads to a divergence of the beam profile of the wave generated in the direction of the optical axis 8 of the crystal 1. As an example thereof, a long stretched-out and more rectangularly distorted beam profile than that of the Gaussian beam profiles of the impinging waves emerges at the exit from crystal 1 (FIG. 2). A fundamental difference has to be made, here, between the beam profile in the so-called near field 13 and the remote field 12 (FIG. 2). This terminology arises from the propagation theory of monochromatic, coherent electromagnetic radiation and demarcates the region in which the circumstances of the light generation play a part, the near field from the adjoining region, the remote field. In typical laser applications, the near field involves an optical path length of between a few mm and 1 m behind the source of radiation. Along this path, the beam profile changes from that shown in FIGS. 1 and 2 to an astigmatic profile with Gaussian intensity distribution. Astigmatic signifies that the beam profile has different beam parameters such as beam diameter and divergence in the horizontal and vertical directions.

It becomes particularly clear that the said transition process from near to remote field does not proceed without further disturbance if an optically refractive surface with an imaging effect is introduced a short distance behind the crystal. In the application of resonators for instance, the positioning of a generally plano-concave mirror at a short distance behind the crystal is absolutely necessary for the correct functioning of the resonator. Although the reflective coating of the said mirror is transparent for the frequency converted radiation, the imaging effect of the curved surface also remains in place for the converted radiation. The mirror thus has the effect of a divergent lens and shifts the transition of the beam profile to the remote field up to infinity under certain circumstances, depending on the curvature of the lens. This implies that where frequency conversion in crystals, particularly in the application of resonators, is involved, beam profiles exhibiting several intensity peaks with intermediate sections (FIG. 2) are to be found within the distance range of up to several meters important for application of the converted radiation. The aforementioned are not Gaussian intensity distributions at all and are thus entirely unsuitable for many applications. The use of frequency converted radiation, particularly in resonators, has thus been severely restricted up till now for this reason The objective of the invention is thus the development of a method generic with the independent claim by means of which it can be warranted that the beam profile of the radiation generated and transformed by the walk-off effect and subsequent transition from near to remote field be converted into a rotationally symmetrical, particularly a circular beam profile with Gaussian intensity distribution. Achievement of the objective is indicated in the features of claim 1. According to the above, a decoupled radiation beam from the non-linear optical material within a light path of length defined by the near to remote field transition of the decoupled radiation is only influenced by a system comprised of at least one optically refractive surface, which has no overall imaging effect. The beam parameters of the decoupled harmonic wave, such as beam diameter and divergence, is changed by the optically refractive surfaces, for example several cylindrical or spherical lenses, in such a way that the desired, particularly circular, Gaussian intensity distribution of the beam profile results. By way of example, only the beam parameters of the horizontal planes can be adjusted to those of the vertical planes by means of cylindrical lenses. The use of optical resonators for frequency conversion, particularly for frequency doubling, prevents any change in the near to remote field transition effected by the type of beam decoupling applied. Any influences involved in the decoupling process are compensated by the effect of optically refractive surfaces with opposed curvature such as that of the decoupling mirror.

The invention is explained hereinafter in more detail in a drawing in the light of exemplary embodiments.

Shown in

Figure 4:
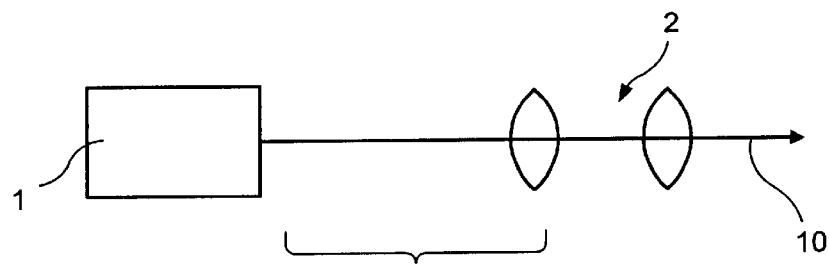
Figure 5:
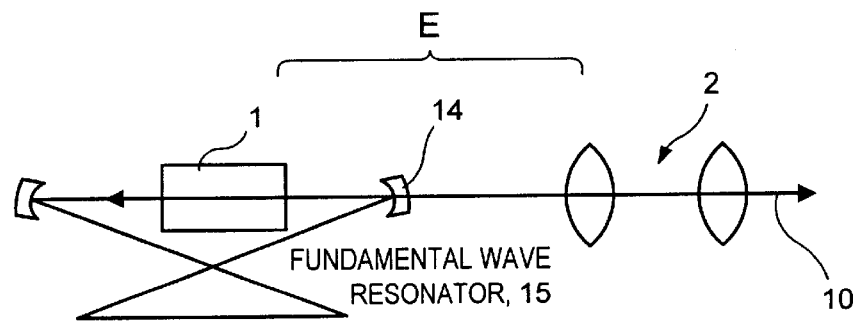
Figure 6:
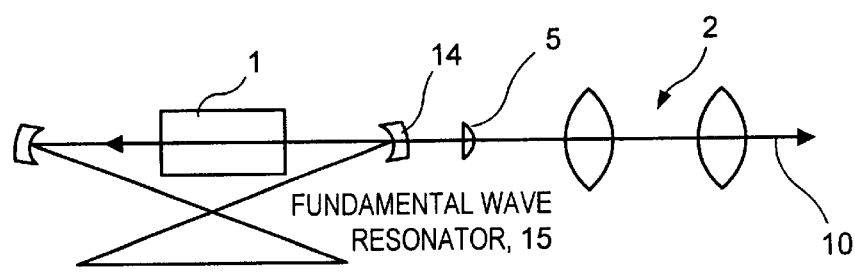

FIG. 1 is a schematic representation of the radiation emerging from a crystal, FIG. 2 is the schematic representation of the intensity distribution of the harmonic wave according to FIG. 1 in the near and remote fields, FIG. 3 is the schematic representation of the influence of a system of two optically refractive surfaces on the emerging harmonic wave, FIG. 4 is the schematic representation of the influence on the emerging harmonic wave shown in FIG. 3 supplemented with a light path of adequate length placed in front of it, FIG. 5 is the schematic representation of the influence on the emerging harmonic wave shown in FIG. 3 and a decoupling mirror placed in front of it, FIG. 6 is the schematic representation of the influence on the emerging harmonic wave shown in FIG. 4 with an additional corrective lens, FIG. 7 is the schematic representation of the influence on the decoupled radiation of an arrangement with a fundamental and harmonic wave reflective decoupling mirror followed up by the system shown in FIG. 3, and FIG. 8 is the schematic representation of the influence on the decoupled radiation of an arrangement with a decoupling mirror reflecting only the harmonic wave.

The invention is particularly but not exclusively intended for application in the non-linear optical process of frequency doubling of laser radiation in crystals wherein the impinging light wave exhibits a Gaussian beam profile. The typical profile of an emerging harmonic wave 10 is shown in FIG. 1. The said profile concerns the near field profile 13 as shown in FIG. 2. changing to a remote field beam profile at a distance dependent on the wavelength and the crystal and focussing characteristics.

Optical resonators which amplify the intensity of the fundamental wave are frequently used to enhance the efficiency of non-linear optical processes, particularly frequency doubling. Extreme enhancement of the harmonic wave output is combined with the above since the output of the harmonic wave is a quadratic function of the fundamental wave output according to the formula $$P_{harmonic\ wave} = c\ P^2_{fundamental\ wave}.$$

The crystal 1, used as non-linear optical material, is positioned in the optical resonator (not shown) in order to utilize the amplified fundamental wave 9. For this reason, the harmonic wave 10 generated has to emerge from the resonator via a mirror forming the optical resonator or via an optical element additionally built into the resonator, and which only reflects the harmonic wave 10, and is thus decoupled. The near to remote field transition is generally influenced in the process. In the present invention, changes in the near to remote field transition when using optical resonators are compensated or prevented by the means chosen for decoupling.

FIG. 3 shows how the generation of a Gaussian intensity distribution in the beam profile of the harmonic wave 10 emerging from the crystal 1 can be brought about by a system 2 consisting of two optically refractory surfaces, for example two cylindrical lenses or two spherical lenses in this case. System 2 can also be formed by one or more than two optically refractive surfaces.

FIG. 4 represents an embodiment wherein a light path of adequate length E for the near to remote field transition is provided for the harmonic wave 10 emerging from the crystal 1, after which the optical influence by means of system 2 according to FIG. 3 first takes place.

FIGS. 5 to 8 relate to the application of the invention in combination with a fundamental wave resonator to amplify the fundamental wave output.

FIG. 5 represents an exemplary embodiment wherein a so-called zero-lens 14 is provided as a decoupling mirror for the harmonic wave 10 out of the fundamental wave resonator 15. A zero-lens consists of an optical element with an impingement and an emergence surface and wherein the refractory effect of the impingement surface is compensated by the refractory effect of the emergence surface. Subsequent to the above is the optical influence of system 2 on the harmonic wave 10 as shown in FIG. 3.

FIG. 6 shows an exemplary embodiment of the invention wherein a curved decoupling mirror attached to a corrective lens 5 and system 2 for optical influence is used for the purpose of decoupling the harmonic wave 10 from the fundamental wave resonator 15.

FIG. 7 shows an exemplary embodiment wherein a fundamental and harmonic wave reflecting mirror 3 and a decoupling mirror 6 are arranged for decoupling the harmonic wave 10. The decoupled harmonic wave 10 is then guided through system 2 according to FIG. 3.

In a further exemplary embodiment of the invention according to FIG. 8, a decoupling mirror 7 reflecting only the harmonic wave 10 is used, and the decoupled harmonic wave then guided to system 2 according to FIG. 3. Either the changed wavelength between the fundamental and harmonic wave or the changed polarization is utilized in the said process.

The invention is not restricted to the exemplary embodiments described in the foregoing. On the contrary, further embodiments may be implemented by combination of the features.

REFERENCE DESIGNATIONS

1 Crystal (non-linear optical material)
2 Optically refractive surface (lens)
3 Mirror
4 Decoupling mirror
5 Corrective lens
6 Decoupling mirror
7 Decoupling mirror
8 Optical axis
9 Fundamental wave
10 Harmonic wave
11 Intensity distribution of the fundamental wave
12 Remote field beam profile of the harmonic wave
13 Near field beam profile of the harmonic wave
14 Zero-lens
15 Fundamental wave resonator
E Light path, near to remote field transition region.

What is claimed is:

1. Method for the production of Gaussian intensity distribution of substantially circular cross-section for the beam profile of radiation generated by non-linear optical processes in non-linear optical materials, the method in which:

a secondary radiation beam which has a non-Gaussian intensity distribution in a near field near the optical material and which has a far field and a transition field intermediate the near field and the far field is produced by directing primary radiation into the non-linear optical material; and the intensity distribution of the secondary radiation beam is modified to Gaussian intensity distribution with a substantially circular cross-section in the far field and at a finite distance from the non-linear optical material by providing an optical system of optical elements in the transition field and selecting the elements so that, taken as a whole, the system of optical elements is without divergence altering effect or imaging effect on the secondary radiation beam.

2. Method according to claim 1 wherein the optical system comprises at least one optically refractive surface.

3. Method according to claim 2 wherein the optically refractive surface is provided by cylindrical lens.

4. Method according to claim 2 wherein the optically refractive surface is provided by a spherical lens.

5. Method according to claim 1 wherein the non-linear optical material is part of a ring resonator including a decoupling mirror for the secondary radiation beam and the method further comprises providing a zero-lens decoupling mirror for supplying the secondary radiation beam to the system of optical elements.

6. Method according to claim 1 wherein the non-linear optical material is part of a ring resonator including a decoupling mirror for the secondary radiation beam and the method further comprises providing a curved decoupling mirror with a corrective lens for supplying the secondary radiation beam to the system of optical elements.

7. Method according to claim 1 wherein the non-linear optical material is part of a ring resonator including a decoupling mirror for the secondary beam and a reflecting mirror and the method further comprises providing a reflecting mirror which reflects both the primary radiation and radiation of the secondary radiation beam, contacting the reflecting mirror and the decoupling mirror with the secondary radiation and thereafter supplying radiation of the secondary radiation beam to the system of optical elements.

8. Method according to claim 7 wherein the radiation of the secondary radiation beam has a characteristic different from the corresponding characteristic of the primary radiation and wherein a decoupling mirror which reflects only the radiation of the secondary radiation beam is provided.

9. Method according to claim 8 wherein the characteristic is frequency.

10. Method according to claim 8 wherein the characteristic is polarization.

11. Method according to claim 1 wherein the secondary radiation beam has a frequency which is a harmonic of the primary radiation frequency.

\* \* \* \* \*